United States Patent
Edvenson et al.

(12) 
(10) Patent No.: US 10,983,939 B2
(45) Date of Patent: *Apr. 20, 2021

(54) SYSTEM AND METHOD FOR INDEPENDENT, DIRECT AND PARALLEL COMMUNICATION AMONG MULTIPLE FIELD PROGRAMMABLE GATE ARRAYS

(71) Applicant: Micron Technology, Inc., Boise, ID (US)

(72) Inventors: Gregory M. Edvenson, Seattle, WA (US); Corey B. Olson, Madison, WI (US)

(73) Assignee: Micron Technology, Inc., Boise, ID (US)

( * ) Notice: Subject to any disclaimer, the term of this patent is extended or adjusted under 35 U.S.C. 154(b) by 547 days.

This patent is subject to a terminal disclaimer.

(21) Appl. No.: 15/669,136

(22) Filed: Aug. 4, 2017

(65) Prior Publication Data

US 2017/0357605 A1 Dec. 14, 2017

Related U.S. Application Data

(63) Continuation of application No. 14/608,464, filed on Jan. 29, 2015, now Pat. No. 9,727,510, which is a continuation-in-part of application No. 14/213,495, filed on Mar. 14, 2014, now Pat. No. 9,740,798, and a continuation-in-part of application No. 14/201,824, filed on Mar. 8, 2014, now Pat. No. 9,734,284, said application No. 14/213,495 is a continuation-in-part of application No. 14/201,824, filed on Mar. 8, 2014, now Pat. No. 9,734,284.

(60) Provisional application No. 61/940,009, filed on Feb. 14, 2014, provisional application No. 61/940,472, filed on Feb. 16, 2014, provisional application No. 61/790,720, filed on Mar. 15, 2013, provisional application No. 61/790,407, filed on Mar. 15, 2013.

(51) Int. Cl.
*G06F 13/40* (2006.01)
*G06F 13/28* (2006.01)

(52) U.S. Cl.
CPC .......... *G06F 13/4022* (2013.01); *G06F 13/28* (2013.01)

(58) Field of Classification Search
None
See application file for complete search history.

(56) References Cited

PUBLICATIONS

Fernandez et al. IEEE Computer Society (2011) DOI 10.1109/FCCM.2011.55.*

* cited by examiner

*Primary Examiner* — Joseph Woitach
(74) *Attorney, Agent, or Firm* — Nancy R. Gamburd; Gamburd Law Group LLC

(57) ABSTRACT

Representative embodiments are disclosed for data transfer between field programmable gate arrays (FPGAs). A representative system includes: a PCIe communication network comprising a PCIe switch and a plurality of PCIe communication lines; a host computing system coupled to the PCIe communication network; a nonblocking crossbar switch; a plurality of memory circuits; and a plurality of field programmable gate arrays, each field programmable gate array configurable for a plurality of data transfers to and from the host computing system and any other field programmable gate array of the plurality of field programmable gate arrays, with each data transfer including a designation of a first memory address, a file size, and a stream number. Once base DMA registers have been initialized for a selected application, no further involvement by the host computing system is involved for the duration of the selected application.

20 Claims, 7 Drawing Sheets

SYSTEM AND METHOD FOR INDEPENDENT, DIRECT AND PARALLEL COMMUNICATION AMONG MULTIPLE FIELD PROGRAMMABLE GATE ARRAYS

CROSS-REFERENCE TO RELATED APPLICATIONS

This application is a continuation of and claims the benefit of and priority to U.S. patent application Ser. No. 14/608,464, filed Jan. 29, 2015, inventors Gregory M. Edvenson et al., titled "System and Method for Independent, Direct and Parallel Communication Among Multiple Field Programmable Gate Arrays", which is a nonprovisional of and, under 35 U.S.C. Section 119, further claims the benefit of and priority to U.S. Provisional Patent Application No. 61/940,009, filed Feb. 14, 2014, inventors Jeremy B. Chritz et al., titled "High Speed, Parallel Configuration of Multiple Field Programmable Gate Arrays", which is commonly assigned herewith, the entire contents of which are incorporated herein by reference with the same full force and effect as if set forth in its entirety herein, and with priority claimed for all commonly disclosed subject matter.

U.S. patent application Ser. No. 14/608,464 also is a nonprovisional of and, under 35 U.S.C. Section 119, further claims the benefit of and priority to U.S. Provisional Patent Application No. 61/940,472, filed Feb. 16, 2014, inventors Jeremy B. Chritz et al., titled "System and Method for Independent, Direct and Parallel Communication Among Multiple Field Programmable Gate Arrays", which is commonly assigned herewith, the entire contents of which are incorporated herein by reference with the same full force and effect as if set forth in its entirety herein, and with priority claimed for all commonly disclosed subject matter.

U.S. patent application Ser. No. 14/608,464 is a continuation-in-part of and further claims priority to U.S. patent application Ser. No. 14/213,495, filed Mar. 14, 2014, inventors Paul T. Draghicescu, Gregory M. Edvenson, and Corey B. Olson, titled "Inexact Search Acceleration", which is a continuation-in-part of and further claims priority to U.S. patent application Ser. No. 14/201,824, filed Mar. 8, 2014, inventor Corey B. Olson, titled "Hardware Acceleration of Short Read Mapping for Genomic and Other Types of Analyses", both of which further claim priority to and the benefit of U.S. Provisional Patent Application No. 61/940,472 and U.S. Provisional Patent Application No. 61/940,009 as referenced above, and further claim priority to and the benefit under 35 U.S.C. Section 119 of U.S. Provisional Patent Application No. 61/790,407, filed Mar. 15, 2013, inventor Corey B. Olson, titled "Hardware Acceleration of Short Read Mapping", and of U.S. Provisional Patent Application No. 61/790,720, filed Mar. 15, 2013, inventors Paul T. Draghicescu, Gregory M. Edvenson, and Corey B. Olson, titled "Inexact Search Acceleration on FPGAs Using the Burrows-Wheeler Transform", which are commonly assigned herewith, the entire contents of which are incorporated herein by reference with the same full force and effect as if set forth in their entireties herein, and with priority claimed for all commonly disclosed subject matter.

U.S. patent application Ser. No. 14/608,464 is a continuation-in-part of and further claims priority to U.S. patent application Ser. No. 14/201,824, filed Mar. 8, 2014, inventor Corey B. Olson, titled "Hardware Acceleration of Short Read Mapping for Genomic and Other Types of Analyses", which further claims priority to and the benefit of U.S. Provisional Patent Application No. 61/940,472, U.S. Provisional Patent Application No. 61/940,009, U.S. Provisional Patent Application No. 61/790,407, and U.S. Provisional Patent Application No. 61/790,720 as referenced above, which are commonly assigned herewith, the entire contents of which are incorporated herein by reference with the same full force and effect as if set forth in their entireties herein, and with priority claimed for all commonly disclosed subject matter.

FIELD OF THE INVENTION

The present invention relates generally to computing systems, and more specifically to the independent, direct and parallel communication among multiple configurable logic circuits such as a plurality of FPGAs.

BACKGROUND

Communication among configurable logic circuits such as field programmable gate arrays ("FPGAs") typically involves considerable host system involvement, which is highly undesirable and often unacceptable for supercomputing applications. For example, Xilinx FPGAs typically require host involvement in setting up registers for every data transfer.

In addition, supercomputing applications would be served advantageously by parallel involvement of multiple FPGAs capable of operating independently and without extensive host involvement.

Accordingly, a need remains for a system having both hardware and software co-design to provide for independent, direct and parallel communication among multiple configurable logic circuits such as a plurality of FPGAs. Such a system should further provide for minimal host involvement, and for significantly parallel and rapid data transfers, including to and from memory located anywhere within the system.

SUMMARY OF THE INVENTION

The exemplary embodiments of the present invention provide numerous advantages. Exemplary embodiments provide for direct FPGA-to-FPGA data transfers in a system without involvement of the host computing system. This allows for independent, direct and parallel communication among multiple configurable logic circuits such as a plurality of FPGAs.

A representative embodiment includes a system couplable to a host computing system, with the system comprising: a PCIe communication network comprising a PCIe switch and a plurality of PCIe communication lines; a plurality of memory circuits; and a plurality of field programmable gate arrays, each field programmable gate array coupled to the PCIe communication network and to at least one memory circuit of the plurality of memory circuits, each field programmable gate array configurable for a plurality of data transfers to any other field programmable gate array of the plurality of field programmable gate arrays, each data transfer including a designation of a first memory address and a stream number. As an option, each data transfer designation may further comprise a file size.

A representative embodiment may further include at least one tertiary field programmable gate array configured as a non-blocking crossbar switch and coupled to the plurality of field programmable gate arrays. In a representative embodiment each data transfer is through the PCIe communication network or through the nonblocking crossbar switch. In a representative embodiment, each data transfer occurs without involvement of the host computing system.

In a representative embodiment, prior to commencement of a computing application, the host computing system transmits a plurality of DMA register messages to one or more field programmable gate arrays of the plurality of field programmable gate arrays, each DMA register message designating a memory address of the plurality of memory circuits, the file size, and the stream number. In such a representative embodiment, each DMA register maintains its designations until another DMA register message changing the designations is received.

Each data transfer may further include a designation of a second memory address and a tie stream number. In such a representative embodiment, in response to receiving a data transfer including designation of the second memory address and the tie stream number, each field programmable gate array is configurable to forward the data transferred to the second memory address and the tie stream number.

A representative embodiment may further include a plurality of data communication lines coupling the plurality of field programmable gate arrays in series, and wherein one or more data transfers occur directly through the plurality of data communication lines and without involvement of the host computing system.

Another representative embodiment includes a system couplable to a host computing system, with the system comprising: a PCIe communication network comprising a PCIe switch and a plurality of PCIe communication lines; a nonblocking crossbar switch; a plurality of memory circuits; and a plurality of field programmable gate arrays, each field programmable gate array coupled to the PCIe communication network, to the nonblocking crossbar switch, and to at least one memory circuit of the plurality of memory circuits, each field programmable gate array configurable for a plurality of data transfers to any other field programmable gate array of the plurality of field programmable gate arrays, each data transfer including a designation of a first memory address and a stream number. As an option, each data transfer designation may further comprise a file size.

In a representative embodiment, each data transfer is through the PCIe communication network or through the nonblocking crossbar switch, and each data transfer occurs without involvement of the host computing system.

Also in a representative embodiment, prior to commencement of a computing application, the host computing system initializes the system and transmits a plurality of DMA register messages to one or more field programmable gate arrays of the plurality of field programmable gate arrays, each DMA register message designating a memory address of the plurality of memory circuits, the file size, and the stream number. Each DMA register maintains its designations until another DMA register message changing the designations is received.

In another representative embodiment, each data transfer further includes a designation of a second memory address and a tie stream number. In response to receiving a data transfer including designation of the second memory address and the tie stream number, each field programmable gate array is configurable to forward the data transferred to the second memory address and the tie stream number.

In a representative embodiment, the nonblocking crossbar switch is implemented using a selected field programmable gate array of the plurality of field programmable gate arrays. In another representative embodiment, the nonblocking crossbar switch is implemented using the PCIe switch or a second PCIe switch.

In another representative embodiment, a system comprises: a PCIe communication network comprising a PCIe switch and a plurality of PCIe communication lines; a host computing system coupled to the PCIe communication network; a nonblocking crossbar switch; a plurality of memory circuits; and a plurality of field programmable gate arrays, each field programmable gate array coupled to the PCIe communication network, to the nonblocking crossbar switch, and to at least one memory circuit of the plurality of memory circuits, each field programmable gate array configurable for a plurality of data transfers to and from the host computing system and any other field programmable gate array of the plurality of field programmable gate arrays, each data transfer including a designation of a first memory address, a file size, and a stream number.

In another representative embodiment, a system comprises: a PCIe communication network comprising a PCIe switch and a plurality of PCIe communication lines; a host computing system coupled to the PCIe communication network; a first field programmable gate array configurable as a nonblocking crossbar switch; a plurality of memory circuits; and a plurality of second field programmable gate arrays, each second field programmable gate array coupled to the PCIe communication network, to the first field programmable gate array configurable as a nonblocking crossbar switch, and to at least one memory circuit of the plurality of memory circuits, each second field programmable gate array configurable for a plurality of data transfers to and from the host computing system and any other second field programmable gate array of the plurality of second field programmable gate arrays, each data transfer including a designation of a first memory address, a file size, and a stream number.

In another representative embodiment, a method of data transfer in a system is disclosed, the system comprising a host computing system, a PCIe communication network, a nonblocking crossbar switch, a plurality of memory circuits, and a plurality of field programmable gate arrays, with the method comprising: using the host computing system, transmitting a plurality of DMA register messages to one or more field programmable gate arrays of the plurality of field programmable gate arrays, each DMA register message designating a first memory address of the plurality of memory circuits, a file size, and a stream number; and using at least one field programmable gate array of the plurality of field programmable gate arrays, transferring data to any other field programmable gate array of the plurality of field programmable gate arrays, each data transfer including a designation of a selected first memory address, file size, and stream number.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF REPRESENTATIVE EMBODIMENTS

Figure 1:
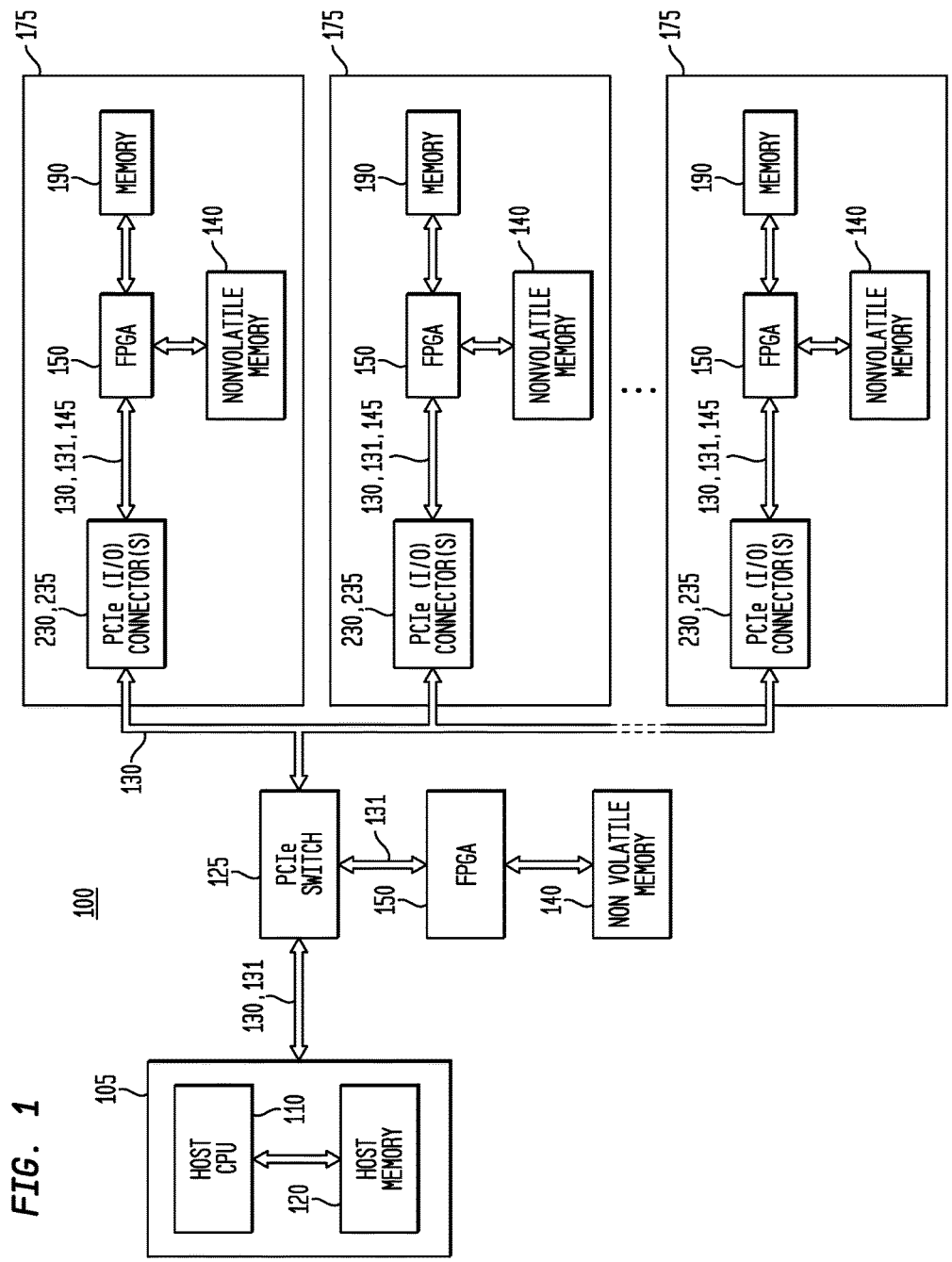
FIG. 1 is a block diagram illustrating an exemplary or representative first system embodiment.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Figure 2:
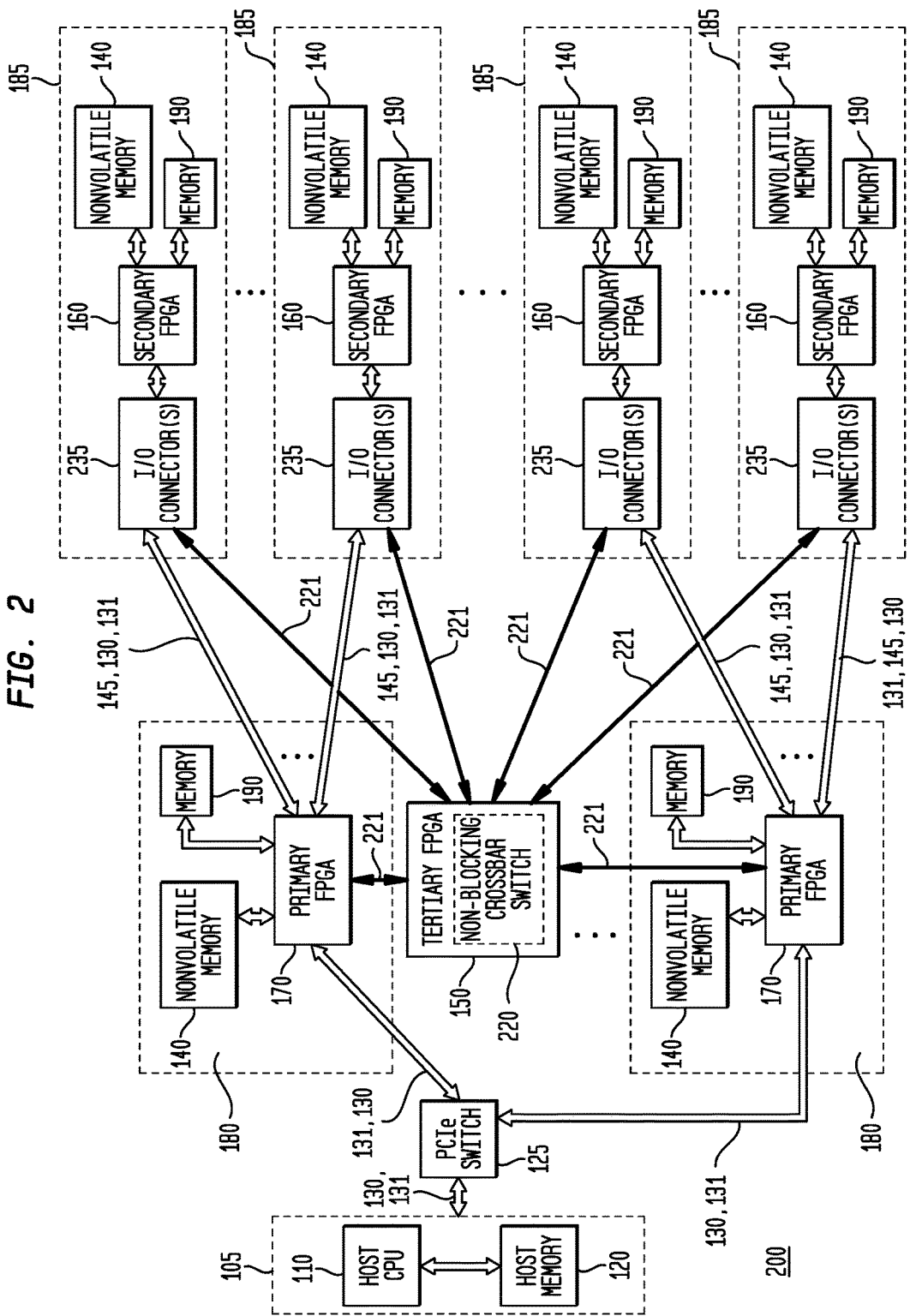
FIG. 2 is a block diagram illustrating an exemplary or representative second system embodiment.
Figure 3:
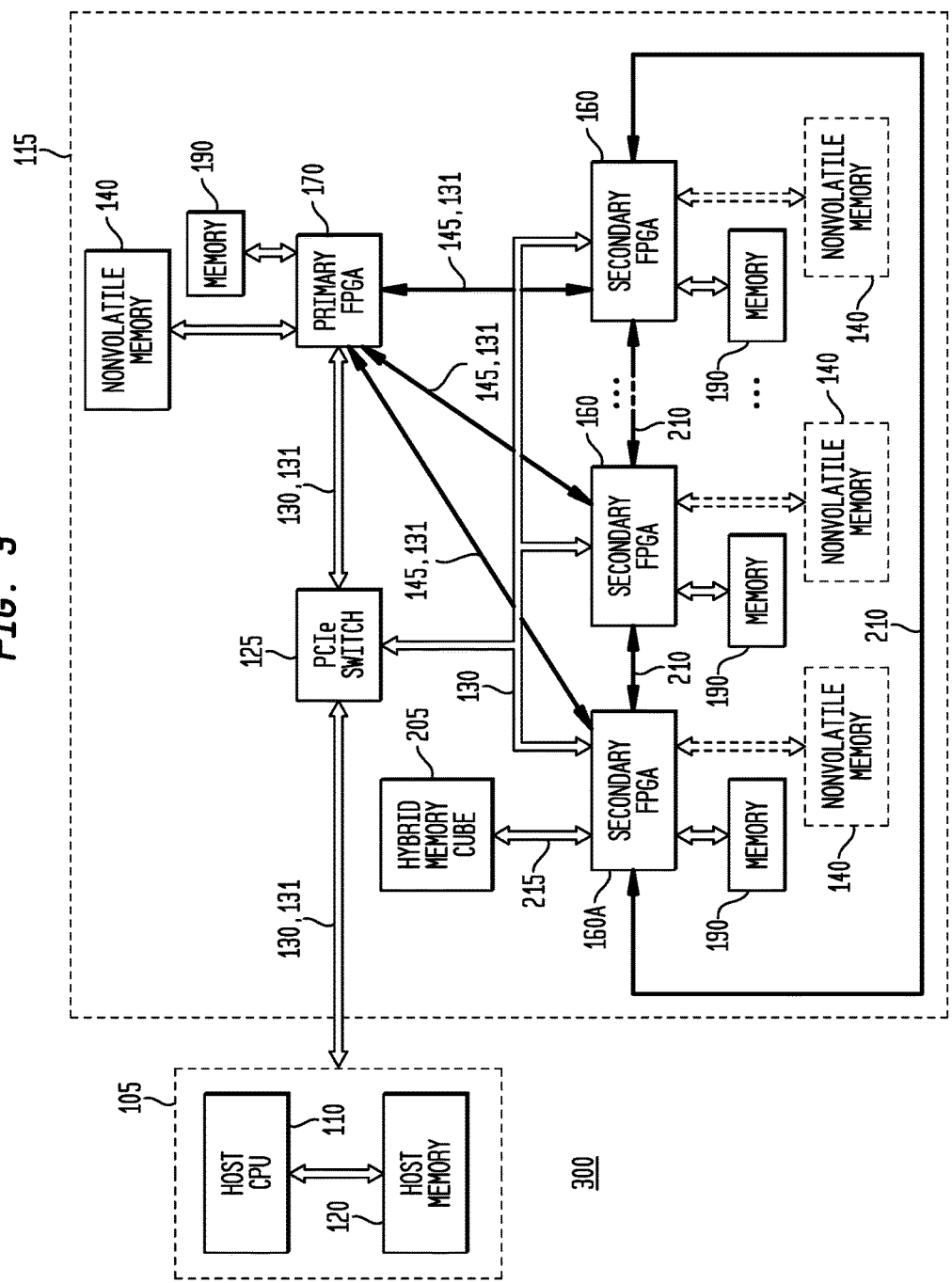
FIG. 3 is a block diagram illustrating an exemplary or representative third system embodiment.
Figure 4:
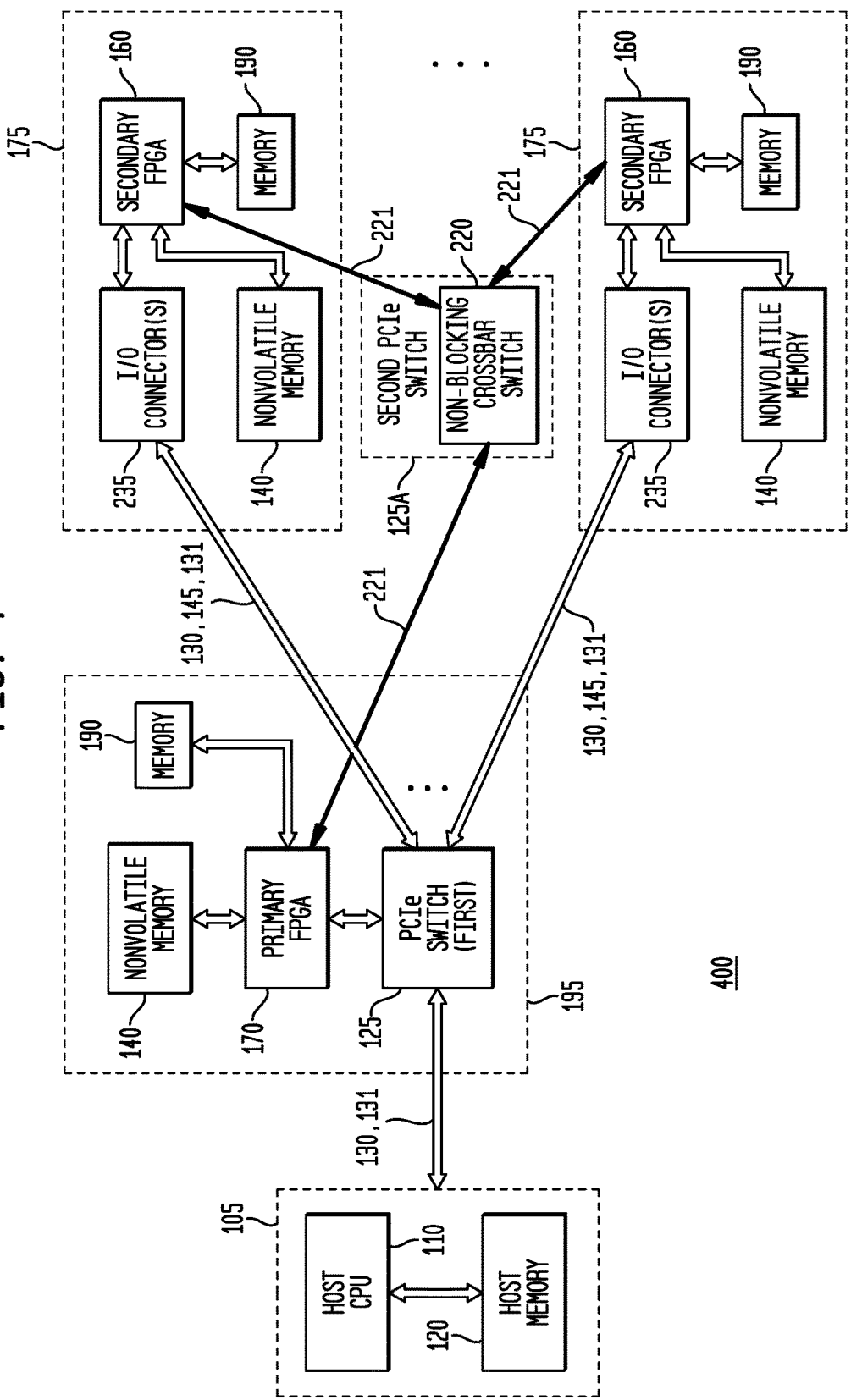
FIG. 4 is a block diagram illustrating an exemplary or representative fourth system embodiment.

FIG. 1 is a block diagram illustrating an exemplary or representative first system 100 embodiment. FIG. 2 is a block diagram illustrating an exemplary or representative second system 200 embodiment. FIG. 3 is a block diagram illustrating an exemplary or representative third system 300 embodiment and first apparatus embodiment. FIG. 4 is a block diagram illustrating an exemplary or representative fourth system 400 embodiment.

As illustrated in FIGS. 1-4, the systems 100, 200, 300, 400 include one or more host computing systems 105, such as a computer or workstation, having one or more central processing units (CPUs) 110, which may be any type of processor, and host memory 120, which may be any type of memory, such as a hard drive or a solid state drive, and which may be located with or separate from the host CPU 110, all for example and without limitation, and as discussed in greater detail below. The memory 120 typically stores data to be utilized in or was generated by a selected application and also generally a configuration bit file or image for a selected application. Not separately illustrated, any of the host computing systems 105 may include a plurality of different types of processors, such as graphics processors, multi-core processors, etc., also as discussed in greater detail below. The various systems 100, 200, 300, 400 differ from one another in terms of the arrangements of circuit components (including on or in various modules), types of components, and types of communication between and among the various components, as described in greater detail below.

The one or more host computing systems 105 are typically coupled through one or more communication channels or lines, illustrated as PCI express (Peripheral Component Interconnect Express or "PCIe") lines 130, either directly or through a PCIe switch 125, to one or more configurable logic elements such as one or more FPGAs 150 (including FPGAs 160, 170) (such as a Spartan 6 FPGA or a Kintex-7 FPGA, both available from Xilinx, Inc. of San Jose, Calif., US, or a Stratix 10 or Cyclone V FPGA available from Altera Corp. of San Jose, Calif., US, for example and without limitation), each of which in turn is coupled to a nonvolatile memory 140, such as a FLASH memory (such as for storing configuration bit images), and to a plurality of random access memories 190, such as a plurality of DDR3 (SODIMM) memory integrated circuits, such as for data storage for computation, communication, etc., for example and without limitation. In a first embodiment as illustrated, each FPGA 150 and corresponding memories 140, 190 directly coupled to that FPGA 150 are collocated on a corresponding computing module (or circuit board) 175 as a module or board in a rack mounted system having many such computing modules 175, such as those available from Pico Computing of Seattle, Wash. US. As illustrated, each computing module 175 includes as an option PCIe input and output (I/O) connector(s) 230 to provide the PCIe 130 connections, such as for a rack mounted system. In representative embodiments, the I/O connector(s) 230, 235 may also include additional coupling functionality, such as JTAG coupling, input power, ground, etc., for example and without limitation, and are illustrated with such additional connectivity in FIG. 4. The PCIe switch 125 may be located or positioned anywhere in a system 100, 200, 300, 400, such as on a separate computing module (such as a backplane circuit board, which can be implemented with computing module 195, for example), or on any of the computing modules 175, 180, 185, 195, 115 for example and without limitation. In addition, other types of communication lines or channels may be utilized to couple the one or more host computing systems 105 to the FPGAs 150, such as an Ethernet line, which in turn may be coupled to other intervening rack-mounted components to provide communication to and from one or more FPGAs 150 (160, 170) and other modules. Also in addition, the various FPGAs 150 (160, 170) may have additional or alternative types of communication between and among the PCIe switch 125 and other FPGAs 150 (160, 170), such as via general purpose (GP) I/O lines 131 (illustrated in FIG. 4).

PCIe switch 125 (e.g., available from PLX Technology, Inc. of Sunnyvale, Calif., US), or one or more of the FPGAs 150 (160, 170), may also be configured (as an option) as one or more non-blocking crossbar switches 220, illustrated in FIG. 1 as part of (or a configuration of) PCIe switch 125. The non-blocking crossbar switch 220 provides for pairwise and concurrent communication (communication lines 221) between and among the FPGAs 150, 160, 170 and any of various memories (120, 190, for example and without limitation), without communication between any given pair of FPGAs 150, 160, 170 blocking any other communication between another pair of FPGAs 150, 160, 170. In exemplary embodiment, one or more non-blocking crossbar switches 220 are provided (within a PCIe switch 125) to have sufficient capacity to enable direct FPGA to FPGA communication between and among all of the FPGAs 150, 160, 170 in a selected portion of the system 100, 200, 300, 400. In another representative embodiment, one or more non-blocking crossbar switches 220 are implemented using one or more FPGAs 150 which have been configured accordingly, as illustrated in FIG. 2, which may also be considered a tertiary (or third) FPGA 150 when included in the various hierarchical embodiments, such as illustrated in FIG. 2. In another representative embodiment, one or more non-blocking crossbar switches 220 are implemented using one or more PCIe switches 125 which also have been configured accordingly, illustrated as second PCIe switch 125A in FIG. 4. In another exemplary embodiment not separately illustrated, one or more non-blocking crossbar switches 220 are provided internally within any of the one or more FPGAs 150, 160, 170 for concurrent accesses to a plurality of memories 190, for example and without limitation.

Referring to FIG. 2, the system 200 differs insofar as the various FPGAs are hierarchically organized into one or more primary (or central) configurable logic elements such as one or more primary FPGAs 170 and a plurality of secondary (or remote) configurable logic elements such as one or more secondary FPGAs 160 (FPGAs 150, 160, 170 may be any type of configurable logic elements (such as a Spartan 6 FPGA, a Kintex-7 FPGA, a Stratix 10, a Cyclone V FPGA as mentioned above, also for example and without limitation). The one or more host computing systems 105 are typically coupled through one or more communication channels or lines, illustrated as PCI express (Peripheral Component Interconnect Express or "PCIe") lines 130, either directly or through a PCIe switch 125, to primary FPGAs 170, each of which in turn is coupled to a plurality of secondary FPGAs 160, also through one or more corresponding communication channels, illustrated as a plurality of JTAG lines 145 (Joint Test Action Group ("JTAG") is the common name for the IEEE 1149.1 Standard Test Access Port and Boundary-Scan Architecture), or through any of the PCIe lines 130 or GP I/O lines 131. In this embodiment, (illustrated in FIG. 2), each of the secondary FPGAs 160 is provided on a separate computing module 185 which is couplable (through I/O connector(s) 235 and PCIe lines 130 and/or JTAG lines 145) to the computing module 180 having the primary FPGA 170. In various embodiments, the PCIe lines 130 and JTAG lines 145 are illustrated as part of a larger bus (which may also include GP I/O lines 131), and typically routed to different pins on the various FPGAs 150, 160, 170, typically via I/O connectors 235, for example, for the various modular configurations or arrangements. As mentioned above, other lines, such as for power, ground, clocking (in some embodiments), etc., also may be provided to a computing module 185 via I/O connectors 235, for example and without limitation. Not separately illustrated in FIG. 2, PCIe switch 125 also may be coupled to a separate FPGA, such as an FPGA 150, such as illustrated in FIG. 1, which also may be coupled to a nonvolatile memory 140, for example and without limitation.

The PCIe switch 125 may be positioned anywhere in a system 100, 200, 300, 400, such as on a separate computing module, for example and without limitation, or on one or more of the computing modules 180 having the primary FPGA 170, as illustrated in FIG. 4 for computing module 195, which can be utilized to implement a backplane for multiple modules 175, as illustrated. In an exemplary embodiment, due to a significantly large fan out of the PCIe lines 130 to other modules and cards in the various systems 100, 200, 300, 400, the PCIe switch 125 is typically located on the backplane of a rack-mounted system (available from Pico Computing, Inc. of Seattle, Wash. US). A PCIe switch 125 may also be collocated on various computing modules (e.g., 195), to which many other modules (e.g., 175) connect (e.g., through PCIe connector(s) 230 or, more generally, I/O connectors 235 which include PCIe, JTAG, GPIO, power, ground, and other signaling lines). In addition, other types of communication lines or channels may be utilized to couple the one or more host computing systems 105 to the primary FPGAs 170 and/or secondary FPGAs 160, such as an Ethernet line, which in turn may be coupled to other intervening rack-mounted components to provide communication to and from one or more primary FPGAs 170 and other modules.

In this system 200 embodiment, the primary and secondary FPGAs 170 and 160 are located on separate computing modules 180 and 185, also in a rack mounted system having many such computing modules 180 and 185, also such as those available from Pico Computing of Seattle, Wash. US. The computing modules 180 and 185 may be coupled to each other via any type of communication lines, including PCIe and/or JTAG. For example, in an exemplary embodiment, each of the secondary FPGAs 160 is located on a modular computing module (or circuit board) 185 which have corresponding I/O connectors 235 to plug into a region or slot of the primary FPGA 170 computing module 180, up to the capacity of the primary FPGA 170 computing module 180, such as one to six modular computing modules 185 having secondary FPGAs 160. In representative embodiments, the I/O connector(s) 235 may include a wide variety of coupling functionality, such as JTAG coupling, PCIe coupling, GP I/O, input power, ground, etc., for example and without limitation. For purposes of the present disclosure, systems 100, 200, 300, 400 function similarly, and any and all of these system configurations are within the scope of the disclosure.

Not separately illustrated in FIGS. 1-4, each of the various computing modules 175, 180, 185, 195, 115 typically include many additional components, such as power supplies, additional memory, additional input and output circuits and connectors, switching components, clock circuitry, etc.

The various systems 100, 200, 300, 400 may also be combined into a plurality of system configurations, such as mixing the different types of FPGAs 150, 160, 170 and computing modules 175, 180, 185, 195, 115 into the same system, including within the same rack-mounted system.

Additional representative system 300, 400 configurations or arrangements are illustrated in FIGS. 3 and 4. In the system 300 embodiment, the primary and secondary FPGAs 150 and 160, along with PCIe switch 125, are all collocated on a dedicated computing module 115 as a large module in a rack mounted system having many such computing modules 115, such as those available from Pico Computing of Seattle, Wash. US. In the system 400 embodiment, (illustrated in FIG. 4), each of the secondary FPGAs 160 is provided on a separate computing module 175 which is couplable to the computing module 195 having the primary FPGA 170. PCIe switches 125 are also illustrated as collocated on computing module 195 for communication with secondary FPGAs 160 over PCIe communication lines 130, although this is not required and such a PCIe switch 125 may be positioned elsewhere in a system 100, 200, 300, 400, such as on a separate computing module, for example and without limitation.

The representative system 300 illustrates some additional features which may be included as options in a computing module, and is further illustrated as an example computing module 115 which does not include the optional nonblocking crossbar switch 220 (e.g., in a PCIe switch 125 or as a configuration of an FPGA 150, 160, 170). As illustrated in FIG. 3, the various secondary FPGAs 160 also have direct communication to each other, with each FPGA 160 coupled through communication lines 210 to its neighboring FPGAs 160, such as serially or "daisy-chained" to each other. Also, one of the FPGAs 160, illustrated as FPGA 160A, has been coupled through high speed serial lines 215, to a hybrid memory cube ("HMC") 205, which incorporates multiple layers of memory and at least one logic layer, with very high memory density capability. For this system 300, the FPGA 160A has been configured as a memory controller (and potentially a switch or router), providing access and communication to and from the HMC 205 for any of the various FPGAs 160, 170.

As a consequence, for purposes of the present disclosure, a system 100, 200, 300, 400 comprises one or more host computing systems 105, couplable through one or more communication lines (such as GP I/O lines 131 or PCIe communication lines (130), directly or through a PCIe switch 125), to one or more FPGAs 150 and/or primary FPGAs 170. In turn, each primary FPGA 170 is coupled through one or more communication lines, such as JTAG lines 145 or PCIe communication lines 130 or GP I/O lines 131, to one or more secondary FPGAs 160. Depending upon the selected embodiment, each FPGA 150, 160, 170 is optionally coupled to a non-blocking crossbar switch 220 (e.g., in a PCIe switch 125 or as a configuration of an FPGA 150, 160, 170) for pairwise communication with any other FPGA 150, 160, 170. In addition, each FPGA 150, 160, 170 is typically coupled to one or more nonvolatile memories 140 and one or more random access memories 190, which may be any type of random access memory.

Significant features are enabled in the system 100, 200, 300, 400 as an option, namely, the highly limited involvement of the host CPU 110 in configuring any and all of the FPGAs 150, 160, 170, which frees the host computing system 105 to be engaged in other tasks. In addition, the configuration of the FPGAs 150, 160, 170 may be performed in a massively parallel process, allowing significant time savings. Moreover, because the full configurations of the FPGAs 150, 160, 170 are not required to be stored in nonvolatile memory 140 (such as FLASH), with corresponding read/write cycles which are comparatively slow, configuration of the FPGAs 150, 160, 170 may proceed at a significantly more rapid rate, including providing new or updated configurations. The various FPGAs 150, 160, 170 may also be configured as known in the art, such as by loading a complete configuration from nonvolatile memory 140.

Another significant feature of the systems 100, 200, 300, 400 is that only basic (or base) resources for the FPGAs 150 or primary FPGAs 170 are stored in the nonvolatile memory 140 (coupled to a FPGA 150 or a primary FPGA 170), such as a configuration for communication over the PCIe lines 130 (and possibly GP I/O lines 131 or JTAG lines 145, such as for secondary FPGAs 160), and potentially also a configuration for one or more DMA engines (depending upon the selected FPGA 150, 160, 170, the FPGA 150, 160, 170 may be available with incorporated DMA engines). As a result, upon system 100, 200, 300, 400 startup, the only configurations required to be loaded into the FPGA 150 or primary FPGA 170 is limited or minimal, namely, communication (e.g., PCIe and possibly JTAG) functionality and or DMA functionality. In a representative embodiment, upon system 100, 200, 300, 400 startup, the only configuration required to be loaded into the FPGA 150 or a primary FPGA 170 is a communication configuration for PCIe functionality. As a consequence, this base PCIe configuration may be loaded quite rapidly from the nonvolatile memory 140. Stated another way, except for loading of the base communication configuration for PCIe functionality, use of the nonvolatile memory 140 for FPGA configuration is bypassed entirely, both for loading of an initial configuration or an updated configuration.

Instead of a host CPU 110 "bit banging" or transferring a very large configuration bit image to each FPGA 150 or primary FPGA 170, configuration of the system 100, 200, 300, 400 occurs rapidly and in parallel when implemented in representative embodiments. Configuration of the FPGAs 150 or primary FPGAs 170 and secondary FPGAs 160 begins with the host CPU 110 merely transmitting a message or command to one or more FPGAs 150 or primary FPGAs 170 with a memory address or location in the host memory 120 (and typically also a file size) of the configuration bit image (or file) which has been stored in the host memory 120, i.e., the host CPU 110 sets the DMA registers of the FPGA 150 or primary FPGA 170 with the memory address and file size for the selected configuration bit image (or file) in the host memory 120. Such a "load FPGA" command is repeated for each of the FPGAs 150 or primary FPGAs 170 (and possibly each secondary FPGA 160, depending upon the selected embodiment), i.e., continuing until the host CPU 110 does not find any more FPGAs 150 or primary FPGAs 170 (and/or secondary FPGAs 160) in the system 100, 200, 300, 400 and an error message may be returned. Typically, the host CPU 110 transmits one such message or command to each FPGA 150 or primary FPGA 170 that will be handling a thread of a parallel, multi-threaded computation. In the representative embodiments, the host CPU 110 is then literally done with the configuration process, and is typically notified with an interrupt signal from a FPGA 150 or primary FPGA 170 once configuration is complete. Stated another way, from the perspective of the host computing system 105, following transmission of generally a single message or command having a designation of a memory address (and possibly a file size), the configuration process is complete. This is a huge advance over prior art methods of FPGA configuration in supercomputing systems.

Using a DMA engine, along with communication lines such PCIe lines 130 which support communication of large bit streams, each FPGA 150 or primary FPGA 170 then accesses the host memory 120 and obtains the configuration bit image (or file) (which configuration also generally is loaded into the FPGA 150 or primary FPGA 170). By using the DMA engine, much larger files may be transferred quite rapidly, particularly compared to any packet- or word-based transmission (which would otherwise have to be assembled by the host CPU 110, a comparatively slow and labor-intensive task). This is generally performed in parallel (or serially, depending upon the capability of the host memory 120) for all of the FPGAs 150 or primary FPGAs 170. In turn, each primary FPGA 170 then transmits (typically over JTAG lines 145 or PCIe communication lines 130) the configuration bit image (or file) to each of the secondary FPGAs 160, also typically in parallel. Alternatively, each primary FPGA 150 may re-transmit (typically over JTAG lines 145 or PCIe communication lines 130) the information of the load FPGA message or command to each of the secondary FPGAs 160, namely the memory address in the host memory 120 and the file size, and each secondary FPGA 160 may read or otherwise obtain the configuration bit image, also using DMA engines, for example and without limitation. As another alternative, the host computing system 105 may transmit the load FPGA message or command to each of the FPGAs 150 or primary FPGAs 170 and secondary FPGAs 160, which then obtain the configuration bit image, also using DMA engines as described above. All such variations are within the scope of the disclosure.

By using communication lines such as PCIe lines 130 and JTAG lines 145 with the design of the system 100, 200, 300, 400, the configuration bit image is loaded quite rapidly into not only into each of the FPGAs 150 and primary FPGAs 170 but also into each of the secondary FPGAs 160. This allows not only for an entire computing module 175 (or computing modules 180, 185, 195) to be reloaded in seconds, rather than hours, but the entire system 100, 200, 300, 400 may be configured and reconfigured in seconds, also rather than hours. As a result, read and write operations to local memory (e.g., nonvolatile memory 140) largely may be bypassed almost completely in the configuration process, resulting in a huge time savings. In selected embodiments, if desired but certainly not required, the configuration bit image (or file) may also be stored locally, such as in nonvolatile memory 140 (and/or nonvolatile memory 190 (e.g., FLASH) associated with computing modules 175, 180, 185, 195, 115).

As a result of this ultrafast loading of configurations, another significant advantage of the system 100, 200, 300, 400 is the corresponding capability, using the same process, for ultrafast reconfiguration of the entire system 100, 200, 300, 400. This is particularly helpful for the design, testing and optimization of system 100, 200, 300, 400 configurations for any given application, including various computationally intensive applications such as bioinformatics applications (e.g., gene sequencing).

Figure 5:
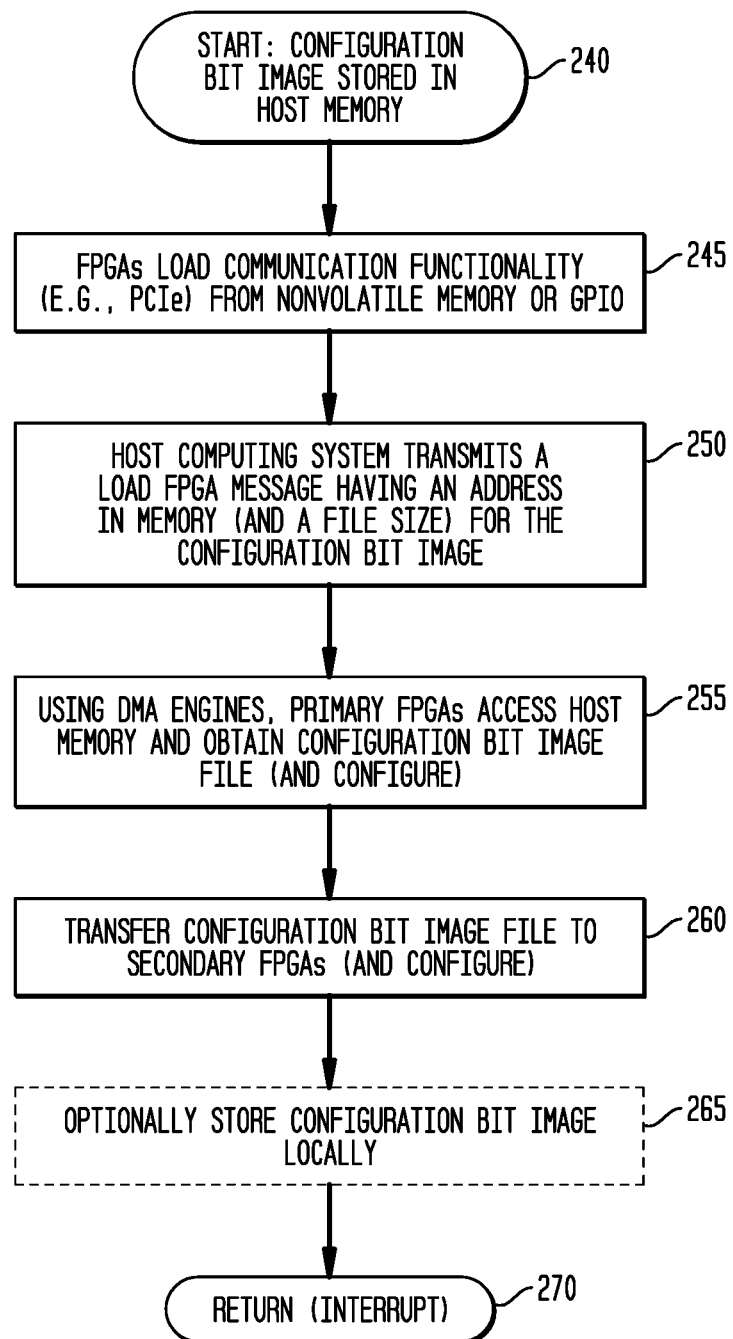
FIG. 5 is a flow diagram illustrating an exemplary or representative configuration method embodiment.

FIG. 5 is a flow diagram illustrating an exemplary or representative method embodiment for system configuration and reconfiguration, and provides a useful summary of this process. Beginning with start step 240 and one or more FPGA 150, 160, 170 configurations (as configuration bit images) having been stored in a host memory 120, the system 100, 200, 300, 400 powers on or otherwise starts up, and the FPGAs 150, 160, 170 load the base communication functionality such as a PCIe configuration image (and possibly DMA functionality) from nonvolatile memory 140, step 245. Step 245 is optional, as such communication functionality also can be provided to FPGAs 150, 160, 170 via GPIO (or GP I/O) lines 131 (general purpose input and output lines), for example and without limitation. The host CPU 110 (or more generally, host computing system 105) then generates and transmits a "load FPGA" command or message to one or more FPGAs 150 or primary FPGAs 170 (and/or secondary FPGAs 160), step 250, in which the load FPGA command or message includes a starting memory address (in host memory 120) and a file size designation for the selected configuration bit image which is to be utilized. Using the DMA engines, and depending upon the selected variation (of any of the variations described above), the one or more FPGAs 150 or primary FPGAs 170 (and/or secondary FPGAs 160) obtain the configuration bit image from the host memory 120, step 255, and use it to configure. Also depending upon the selected embodiment, the one or more FPGAs 150 or primary FPGAs 170 may also transfer the configuration bit image to each of the secondary FPGAs 160, step 260, such as over JTAG lines 145 and bypassing nonvolatile memory 140, 190, which the secondary FPGAs 160 also use to configure. Also depending upon the selected embodiment, the configuration bit image may be stored locally, step 265, as a possible option as mentioned above. Having loaded the configuration bit image into the FPGAs 150, 160, 170, the method may end, return step 270, such as by generating an interrupt signal back to the host computing system 105.

The systems 100, 200, 300, 400 enable one of the significant features of the present disclosure, namely, the highly limited involvement of the host CPU 110 in data transfers between the host computing system 105 and any of the FPGAs 150, 160, 170, and their associated memories 190, and additionally, the highly limited involvement of the host CPU 110 in data transfers between and among any of the FPGAs 150, 160, 170, and their associated memories 190, all of which frees the host computing system 105 to be engaged in other tasks, and further is a significant departure from prior art systems. Once data transfer directions or routes have been established for a given or selected application within the systems 100, 200, 300, 400, moreover, these data communication paths are persistent for the duration of the application, continuing without any further involvement by the host computing system 105, which is also a sharp contrast with prior art systems.

Instead of a host CPU 110 "bit banging" or transferring a data file, including a very large data file, to each FPGA 150, 160, 170 or its associated memories 190, data transfers within the system 100, 200, 300, 400 occur rapidly and in parallel, and following setup of the DMA registers in the various FPGAs 150, 160, 170, largely without involvement of the host computing system 105. The data transfer paths are established by the host CPU 110 (or an FPGA 150, 160, 170 configured for this task) merely transmitting a message or command to one or more FPGAs 150, 160, 170 to set the base DMA registers within the FPGA 150, 160, 170 with a memory 190 address (or address or location in the host memory 120, as the case may be), optionally a file size of the data file, and a stream number., i.e., the host CPU 110 (or another FPGA 150, 160, 170 configured for this task) sets the DMA registers of the FPGA(s) 150, 160, 170 with the memory address (and optionally a file size) for the selected data file in the host memory 120 or in one of the memories 190, and also assigns a stream number, including a tie (or tied) stream number if applicable. Once this is established, the system 100, 200, 300, 400 is initialized for data transfer, and these assignments persist for the duration of the application, and do not need to be re-established for subsequent data transfers. It should be noted that the data to be transferred may originate from anywhere within a system 100, 200, 300, 400, including real-time generation by any of the FPGAs 150, 160, 170, any of the local memories, including memories 190, in addition to the host memory 120, and in addition to reception from an external source, for example and without limitation.

The host CPU 110 (or an FPGA 150, 160, 170 configured for this task) has therefore established the various data transfer paths between and among the host computing system 105 and the FPGAs 150, 160, 170 for the selected application. As data is then transferred throughout the system 100, 200, 300, 400, header information for any data transfer includes not only a system address (e.g., PCIe address) for the FPGA 150, 160, 170 and/or its associated memories 190, but also includes the "stream" designations (or information) and "tie (or tied) stream" designations (or information), and is particularly useful for multi-threaded or other parallel computation tasks. The header (e.g., a PCIe data packet header) for any selected data transfer path includes: (1) bits for an FPGA 150, 160, 170 and/or memory 190 address and optionally a file size; (2) additional bits for an assignment a stream number to the data transfer (which stream number can be utilized repeatedly for additional data to be transferred subsequently for ongoing computations); and (3) additional bits for any "tie stream" designations, if any are utilized or needed. In addition, as each FPGA 150, 160, 170 may be coupled to a plurality of memories 190, each memory address typically also includes a designation of which memory 190 associated with the designated FPGA 150, 160, 170.

Figure 6:
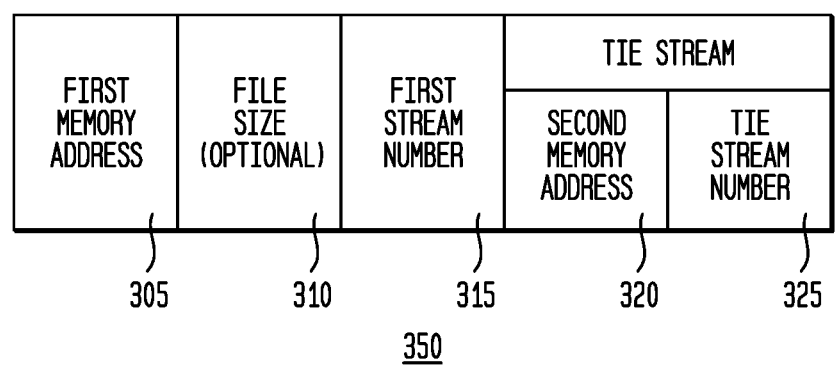
FIG. 6 is a block diagram illustrating exemplary or representative fields for a (stream) packet header.

FIG. 6 is a block diagram illustrating exemplary or representative fields for a (stream) packet header 350, comprising a plurality of bits designating a first memory address (field 305) (typically a memory 190 address), a plurality of bits designating a file size (field 310) (as an optional field), a plurality of bits designating a (first) stream number (field 315), and as may be necessary or desirable, two additional and optional tie stream fields, namely, a plurality of bits designating the (second) memory 190 address for the tied stream (field 320) and a plurality of bits designating a tie (or tied) stream number (field 325).

Any application may then merely write to the selected stream number or read from the selected stream number for the selected memory 190 address (or FPGA 150, 160, 170 address), without any involvement by the host computing system 105, for as long as the application is running on the system 100, 200, 300, 400. In addition, for data transfer throughout the systems 100, 200, 300, 400, data transfer in one stream may be tied to a data transfer of another stream, allowing two separate processes to occur without involvement of the host computing system 105. The first "tie stream" process allows the "daisy chaining" of data transfers, so a data transfer to a first stream number for a selected memory 190 (or FPGA 150, 160, 170 process) on a first computing module 175, 180, 185, 195, 115 may be tied or chained to a subsequent transfer of the same data to another, second stream number for a selected memory 190 (or FPGA 150, 160, 170 process) on a second computing module 175, 180, 185, 195, 115, e.g., data transferred from the host computing system 105 or from a first memory 190 on a first computing module 175, 180, 185, 195, 115 (e.g., card "A") (stream "1") to a second memory 190 on a second computing module 175, 180, 185, 195, 115 (e.g., card "B") will also be further transmitted from the second computing module 175, 180, 185, 195, 115 (e.g., card "B") as a stream "2" to a third memory 190 on a third computing module 175, 180, 185, 195, 115 (e.g., card "C"), thereby tying streams 1 and 2, not only for the current data transfer, but for the entire duration of the application (until changed by the host computing system 105).

The second "tie stream" process allows the chaining or sequencing of data transfers between and among any of the FPGAs 150, 160, 170 without any involvement of the host computing system 105 after the initial setup of the DMA registers in the FPGAs 150, 160, 170. As a result, a data result output from a first stream number for a selected memory 190 (or FPGA 150, 160, 170 process) on a first computing module 175, 180, 185, 195, 115 may be tied or chained to be input data for another, second stream number for a selected memory 190 (or FPGA 150, 160, 170 process) on a second computing module 175, 180, 185, 195, 115, e.g., stream "3" data transferred from the a first memory 190 on a first computing module 175, 180, 185, 195, 115 (e.g., card "A") will transferred as a stream "4" to a second memory 190 on a second computing module 175, 180, 185, 195, 115 (e.g., card "B"), thereby tying streams 3 and 4, not only for the current data transfer, but for the entire duration of the application (also until changed by the host computing system 105).

Any of these various data transfers may occur through any of the various communication channels of the systems 100, 200, 300, 400, and to and from any available internal or external resource, in addition to transmission over the PCIe network (PCIe switch 125 with PCIe communication lines 130), including through the non-blocking crossbar switch 220 (as an option) and over the JTAG lines 145 and/or GP I/O lines 131 and/or communication lines 210, depending upon the selected system 100, 200, 300, 400 configuration. All of these various mechanisms provide for several types of direct FPGA-to-FPGA communication, without any ongoing involvement by host computing system 105 once the DMA registers have been established. Stated another way, in the representative embodiments, the host CPU 110 is then literally done with the data transfer process, and from the perspective of the host computing system 105, following transmission of the DMA setup messages having a designation of a memory 190 address, a file size (as an option), and a stream number, the data transfer configuration process is complete. This is a huge advance over prior art methods of data transfer in supercomputing systems utilizing FPGAs.

Using a DMA engine, along with communication lines such PCIe lines 130 which support communication of large bit streams, each FPGA 150, 160, 170 then accesses the host memory 120, or a memory 190, or any other data source, and obtains the data file for a read operation, or performs a corresponding write operation, all using the established address and stream number. By using the DMA engine, much larger files may be transferred quite rapidly, particularly compared to any packet- or word-based transmission. This is generally performed in parallel (or serially, depending upon the application) for all of the FPGAs 150, 160, 170.

By using communication lines such as PCIe lines 130 and JTAG lines 145 with the design of the system 100, 200, 300, 400, data transfer occurs quite rapidly, not only into each of the FPGAs 150 or primary FPGAs 170 but also into each of the secondary FPGAs 160, and their associated memories 190. As a result, resources, including memory 190, may be shared across the entire system 100, 200, 300, 400, with any FPGA 150, 160, 170 being able to access any resource anywhere in the system 100, 200, 300, 400, include any of the memories 190 on any of the computing modules or cards (modules) 175, 180, 185, 195, 115.

Figure 7:
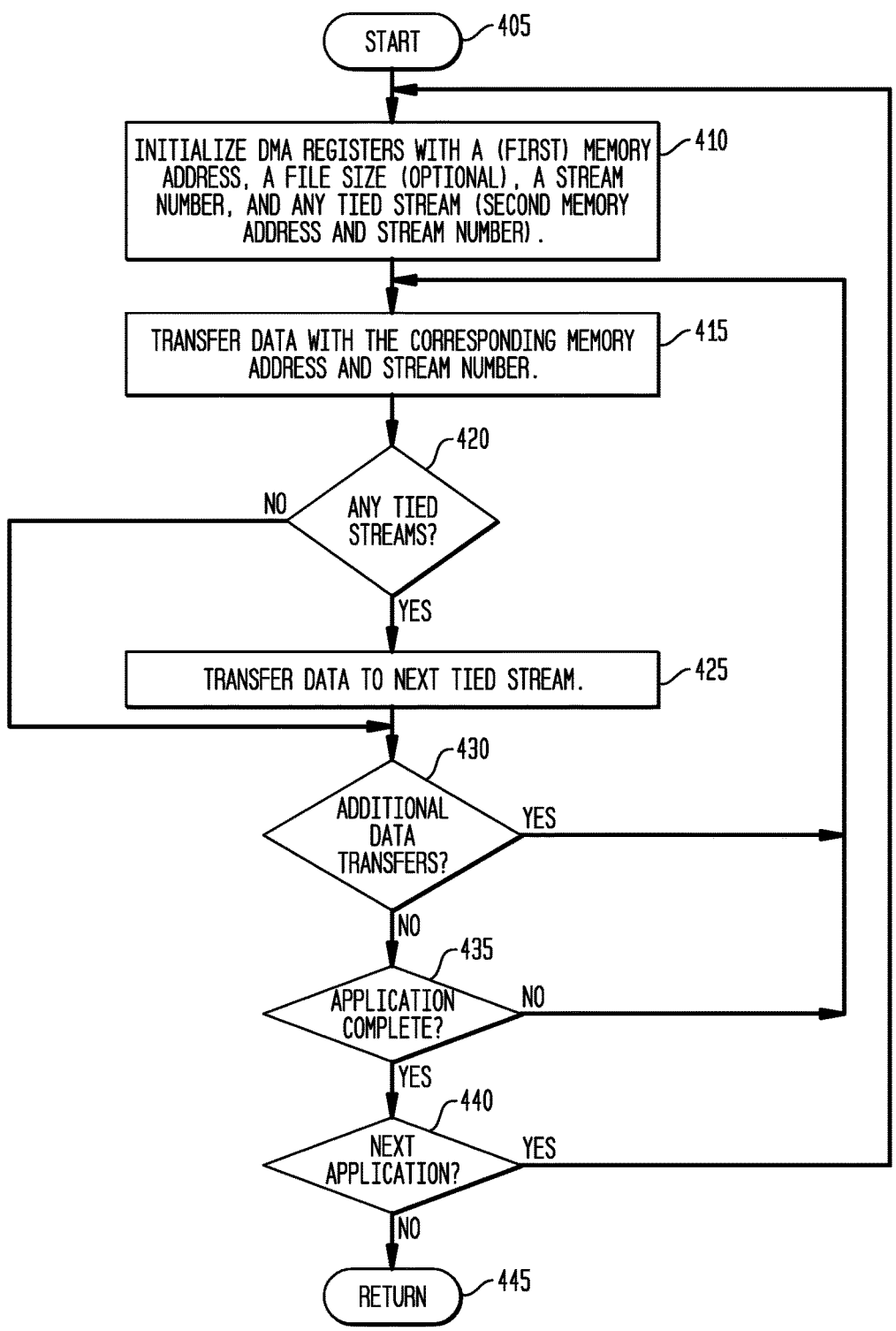
FIG. 7 is a flow diagram illustrating an exemplary or representative communication method embodiment.

FIG. 7 is a flow diagram illustrating an exemplary or representative method embodiment for data transfer within a system 100, 200, 300, 400 and provides a useful summary. Beginning with start step 405, one or more DMA registers associated with any of the FPGAs 150, 160, 170 and their associated memories 190 are setup, step 410, with a memory (120, 190) address, a file size (as an option, and not necessarily required), a stream number, and any tie (or tied) stream number. Using the DMA engines for read and write operations, or using other available configurations within FPGAs 150, 160, 170, data is transferred between and among the FPGAs 150, 160, 170 using the designated addresses and stream numbers, step 415. When there are any tied streams, step 420, then the data is transferred to the next tied stream, step 425, as the case may be. When there are additional data transfers, step 430, the method returns to step 415, and the process iterates. Otherwise, the method determines whether the application is complete, step 435, and if not, returns to step 415 and iterates as well. When the application is complete in step 435, and there is another application to be run, step 440, the method returns to step 410 to set up the DMA registers for the next application, and iterates. When there are no more applications to be run, the method may end, return step 445.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

A CPU or "processor" 110 may be any type of processor, and may be embodied as one or more processors 110, configured, designed, programmed or otherwise adapted to perform the functionality discussed herein. As the term processor is used herein, a processor 110 may include use of a single integrated circuit ("IC"), or may include use of a plurality of integrated circuits or other components connected, arranged or grouped together, such as controllers, microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components, whether analog or digital. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, FLASH, EPROM or $E^2$PROM. A processor (such as processor 110), with its associated memory, may be adapted or configured (via programming, FPGA interconnection, or hard-wiring) to perform the methodology of the invention, as discussed above. For example, the methodology may be programmed and stored, in a processor 110 with its associated memory (and/or memory 120) and other equivalent components, as a set of program instructions or other code (or equivalent configuration or other program) for subsequent execution when the processor is operative (i.e., powered on and functioning). Equivalently, when the processor 110 may implemented in whole or part as FPGAs, custom ICs and/or ASICs, the FPGAs, custom ICs or ASICs also may be designed, configured and/or hard-wired to implement the methodology of the invention. For example, the processor 110 may be implemented as an arrangement of analog and/or digital circuits, controllers, microprocessors, DSPs and/or ASICs, collectively referred to as a "processor", which are respectively hard-wired, programmed, designed, adapted or configured to implement the methodology of the invention, including possibly in conjunction with a memory 120.

The memory 120, 140, 190, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 110), whether volatile or non-volatile, whether removable or non-removable, including without limitation RAM, FLASH, DRAM, SDRAM, SRAM, MRAM, FeRAM, ROM, EPROM or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 120, 140, 190 may be adapted to store various look up tables, parameters, coefficients, other information and data, programs or instructions (of the software of the present invention), and other types of tables such as database tables.

As indicated above, the processor 110 is hard-wired or programmed, using software and data structures of the invention, for example, to perform the methodology of the present invention. As a consequence, the system and method of the present invention may be embodied as software which provides such programming or other instructions, such as a set of instructions and/or metadata embodied within a non-transitory computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the processor 110, for example).

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 120, 140, 190, e.g., a floppy disk, a CDROM, a CD-RW, a DVD, a magnetic hard drive, an optical drive, or any other type of data storage apparatus or medium, as mentioned above.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A system couplable to a host computing system, the system comprising:

a PCIe communication network comprising a PCIe switch and a plurality of PCIe communication lines;
a plurality of memory circuits; and
a plurality of field programmable gate arrays, each field programmable gate array coupled to the PCIe communication network and to at least one memory circuit of the plurality of memory circuits, each field programmable gate array configured to generate a data packet, for each data transfer of a plurality of data transfers, comprising a data transfer header having a designation of a first memory address and a stream number.

2. The system of claim 1, wherein each field programmable gate array of the plurality of field programmable gate arrays is further configured to generate a plurality of data transfers to any other field programmable gate array of the plurality of field programmable gate arrays.

3. The system of claim 1, further comprising:
at least one tertiary field programmable gate array configured as a non-blocking crossbar switch and coupled to the plurality of field programmable gate arrays;
wherein each field programmable gate array is further configured to perform one or more data transfers through the PCIe communication network or through the nonblocking crossbar switch, and wherein each field programmable gate array is further configured to perform at least some data transfers of the plurality of data transfers in parallel and directly between or among the plurality of field programmable gate arrays.

4. The system of claim 1, wherein each field programmable gate array is further configured to include a file size designation in each data transfer header.

5. The system of claim 1, wherein prior to commencement of a computing application to be performed by one or more field programmable gate arrays of the plurality of field programmable gate arrays, the host computing system is adapted to transmit a plurality of DMA register messages to the one or more field programmable gate arrays, each DMA register message designating a memory address of the plurality of memory circuits, a file size, and the stream number.

6. The system of claim 5, wherein each DMA register maintains its designations until another DMA register message changing the designations is received.

7. The system of claim 1, wherein each field programmable gate array is further configured to include a designation of a second memory address and a tie stream number in one or more data transfer headers.

8. The system of claim 7, wherein in response to receiving a data transfer including the designation of the second memory address and the tie stream number, each field programmable gate array is further configured to forward the data transferred to the second memory address and the tie stream number.

9. The system of claim 1, further comprising:
a plurality of data communication lines coupling the plurality of field programmable gate arrays in series, and wherein each field programmable gate array is further configured to perform one or more data transfers directly through the plurality of data communication lines.

10. A method of data transfer in a system, the system comprising a host computing system, a PCIe communication network, a plurality of memory circuits, and a plurality of field programmable gate arrays, with each field programmable gate array coupled to the PCIe communication network and to at least one memory circuit of the plurality of memory circuits, the method comprising:

configuring each field programmable gate array of the plurality of field programmable gate arrays to generate a plurality of data transfers to any other field programmable gate array of the plurality of field programmable gate arrays; and configuring each field programmable gate array of the plurality of field programmable gate arrays to generate a data packet, for each data transfer of the plurality of data transfers, comprising a data transfer header having a designation of a first memory address of the plurality of memory circuits and a stream number of a plurality of stream numbers.

11. The method of claim 10, further comprising:
using the host computing system, transmitting a plurality of DMA register messages to one or more field programmable gate arrays of the plurality of field programmable gate arrays, each DMA register message designating a selected memory address of the plurality of memory circuits, a selected file size, and a selected stream number of the plurality of stream numbers.

12. The method of claim 11, further comprising:
maintaining the designations in each DMA register until another DMA register message changing the designations is received by the one or more field programmable gate arrays of the plurality of field programmable gate arrays.

13. The method of claim 10, further comprising:
configuring each field programmable gate array to include a file size designation in each data transfer header.

14. The method of claim 10, further comprising:
configuring each field programmable gate array to include a designation of a second memory address and a tie stream number in one or more data transfer headers.

15. The method of claim 14, further comprising:
configuring each field programmable gate array to, in response to receiving a data transfer including the designation of the second memory address and the tie stream number, forward the data transferred to the second memory address and the tie stream number.

16. The method of claim 10, wherein at least some data transfers of the plurality of data transfers occur in parallel and directly between or among the plurality of field programmable gate arrays.

17. A system comprising:
a PCIe communication network comprising a PCIe switch and a plurality of PCIe communication lines;
a nonblocking crossbar switch;
a plurality of memory circuits;
a plurality of field programmable gate arrays, each field programmable gate array coupled to the PCIe communication network, to the nonblocking crossbar switch, and to at least one memory circuit of the plurality of memory circuits, each field programmable gate array configured to generate a plurality of data transfers to and from any other field programmable gate array of the plurality of field programmable gate arrays, each field programmable gate array further configured to generate a data packet, for each data transfer of the plurality of data transfers, comprising a data transfer header having a designation of a first memory address and a stream number; and
a host computing system coupled to the PCIe communication network, wherein prior to commencement of a computing application to be performed by one or more field programmable gate arrays of the plurality of field programmable gate, the host computing system is adapted to transmit a plurality of DMA register messages to the one or more field programmable gate arrays, each DMA register message designating a selected memory address of the plurality of memory circuits, a selected file size, and a selected stream number.

18. The system of claim 17, wherein each data transfer header further comprises a file size designation, and wherein each DMA register maintains its designations until another DMA register message changing the designations is received.

19. The system of claim 17, wherein each field programmable gate array is further configured to include a designation of a second memory address and a tie stream number in one or more data transfer headers.

20. The system of claim 19, wherein in response to receiving a data transfer including the designation of the second memory address and the tie stream number, each field programmable gate array is further configured to forward the data transferred to the second memory address and the tie stream number.

* * * * *